United States Patent
Mathews et al.

(10) Patent No.: US 6,609,498 B2
(45) Date of Patent: Aug. 26, 2003

(54) TARGET WHEEL TOOTH DETECTION

(75) Inventors: David Stewart Mathews, Howell, MI (US); Donald Clayton Warner, Byron, MI (US); Jason Thomas Davis, Williamston, MI (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 09/896,587

(22) Filed: Jul. 2, 2001

(65) Prior Publication Data

US 2003/0000498 A1 Jan. 2, 2003

(51) Int. Cl.[7] ................................................. F02P 5/00
(52) U.S. Cl. ................... 123/406.62; 73/116; 73/117.3; 701/110
(58) Field of Search ................. 123/406.62; 73/117.3, 73/514.31, 116; 701/110

(56) References Cited

U.S. PATENT DOCUMENTS 5,469,823 A * 11/1995 Ott et al. ............... 123/406.62
5,619,968 A * 4/1997 Hillsberg et al. ....... 123/406.13
5,630,396 A * 5/1997 Fukui et al. ............ 123/406.18
5,671,145 A * 9/1997 Krebs et al. ................ 123/352
5,715,780 A * 2/1998 Haller ..................... 123/90.17
5,934,263 A * 8/1999 Russ et al. .................. 123/698
6,302,085 B1 * 10/2001 Sekine et al. .......... 123/406.18
6,474,278 B1 * 11/2002 Davis et al. ............. 123/90.15

* cited by examiner

*Primary Examiner*—John Kwon
(74) *Attorney, Agent, or Firm*—Christopher DeVries

(57) ABSTRACT

A method and apparatus for determining the switching states of a target wheel used in an internal combustion engine, the method including providing a camshaft, providing a target wheel having teeth coupled to the camshaft, providing a sensor to detect the teeth of the target wheel, providing a cam phaser to phase the camshaft relative to a crankshaft of the internal combustion engine, homing the cam phaser to a known position relative to the crankshaft, rotating the crankshaft and camshaft, detecting the switching of the teeth by the sensor, referencing switching information detected by the teeth to crankshaft position information to produce a calibration for the target wheel, and storing the calibration in a controller to be use for control of the internal combustion engine.

11 Claims, 3 Drawing Sheets

TARGET WHEEL TOOTH DETECTION

TECHNICAL FIELD

The present invention relates to the control of an internal combustion engine. More specifically, the present invention relates to calibrating target wheels for speed, timing, and position sensing systems used in internal combustion engines.

BACKGROUND OF THE INVENTION

Presently, automotive companies manufacture data or target wheels for use with speed sensors to detect the speed, timing, and position of an engine crankshaft and/or a camshaft. As is known in the art of four-cycle internal combustion engines (ICEs), position and timing between a crankshaft and a camshaft is very important for the application and synchronization of spark and fuel, as the camshaft actuates the intake and exhaust valves of an ICE. A camshaft may be used in an overhead valve (OHV) configuration where the valves are actuated via pushrods, or in an overhead cam (OHC) configuration where the valves are acted on directly by the camshaft. The camshaft is driven by the crankshaft through a 1:2 reduction (i.e., two rotations of the crankshaft equal one rotation of the camshaft) and the camshaft speed is one-half that of the crankshaft. The crankshaft and camshaft position, for engine control purposes, are measured at a small number of fixed points, and the number of such measurements may be determined by the number of cylinders in the ICE.

As previously described, engine control systems use the timing and position information supplied by a crankshaft and camshaft sensor for controlling the application of spark and fuel to the cylinders of an ICE. The position and timing (phase) of a first camshaft controlling exhaust valves for a cylinder and/or a second camshaft controlling intake valves for a cylinder in an overhead cam engine may be controlled relative to the crankshaft (piston position) to reduce emissions and improve fuel economy. Several cam-phasing devices (cam phasers) exist in today's automotive market that require accurate position and timing information provided by the camshaft position sensor. The crankshaft and/or camshaft position sensor typically include a variable reluctance or Hall effect sensor positioned to sense the passage of a tooth, tab and/or slot on a target or data wheel coupled to the camshaft.

The target or data wheel used with present camshaft position sensors have a distribution of teeth, tabs and/or slots. The camshaft position sensor typically comprises a variable reluctance or Hall effect sensor positioned to sense the teeth on a target or data wheel coupled to the camshaft. The magnetic properties and material composition of the target wheel will vary where and when the sensor senses the teeth on a moving target wheel. This variation may cause problems in the feedback provided by the sensor. For example, two target wheels with identical footprints but made of different materials will have different magnetic and switching characteristics. Referring to FIG. 1, a sensor 18 is positioned to sense the teeth 40/41 of target wheel 23. For a first material, the sensor may switch at point A and for a second material the sensor 18 may switch at point B. The varying material compositions that happen during manufacturing processes even within the same "batch" of target wheels produced in the same factory may lead to an inconsistency in sensing or switching. This difference in switching between point A and point B will adversely affect the ability to predict the switching position of the sensor 18 and program or calibrate the control of an ICE. Thus, there is a need to better determine the magnetic and switching characteristics for a target wheel to more accurately control an ICE.

SUMMARY OF THE INVENTION

The present invention comprises a target wheel calibration method and apparatus used to detect camshaft and crankshaft timing, position and speed for a four-cycle internal combustion engine ("ICE"). The present invention utilizes a method of detecting the position of a target wheel tooth (or teeth) at a known position relative to the crankshaft and camshaft. The method comprises zeroing/homing a cam phaser coupled to the target wheel and camshaft and then rotating the crankshaft through two revolutions (thereby rotating the camshaft one revolution) to determine where the teeth of the target wheel switch the sensor. The switching time and position of the teeth of the target wheel on the camshaft are referenced to the target wheel pulse train of the crankshaft. The switching position of the target wheel on the camshaft is thus "known" with respect to the position of the crankshaft and corresponding cylinder events. This position and timing information is stored and referenced by a controller to control the functions of the ICE.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
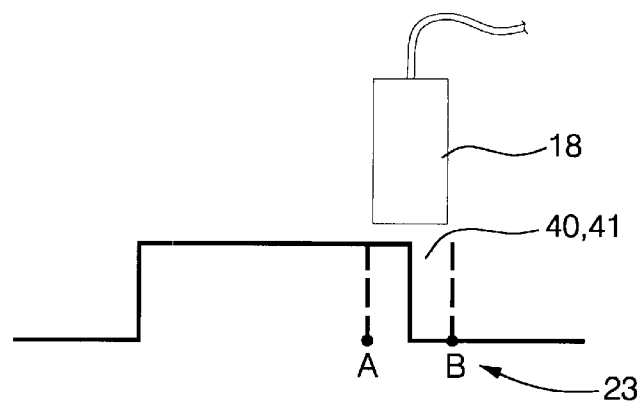
FIG. 1 is a diagrammatic drawing illustrating the variation in switching properties that may occur with target wheels.
Figure 2:
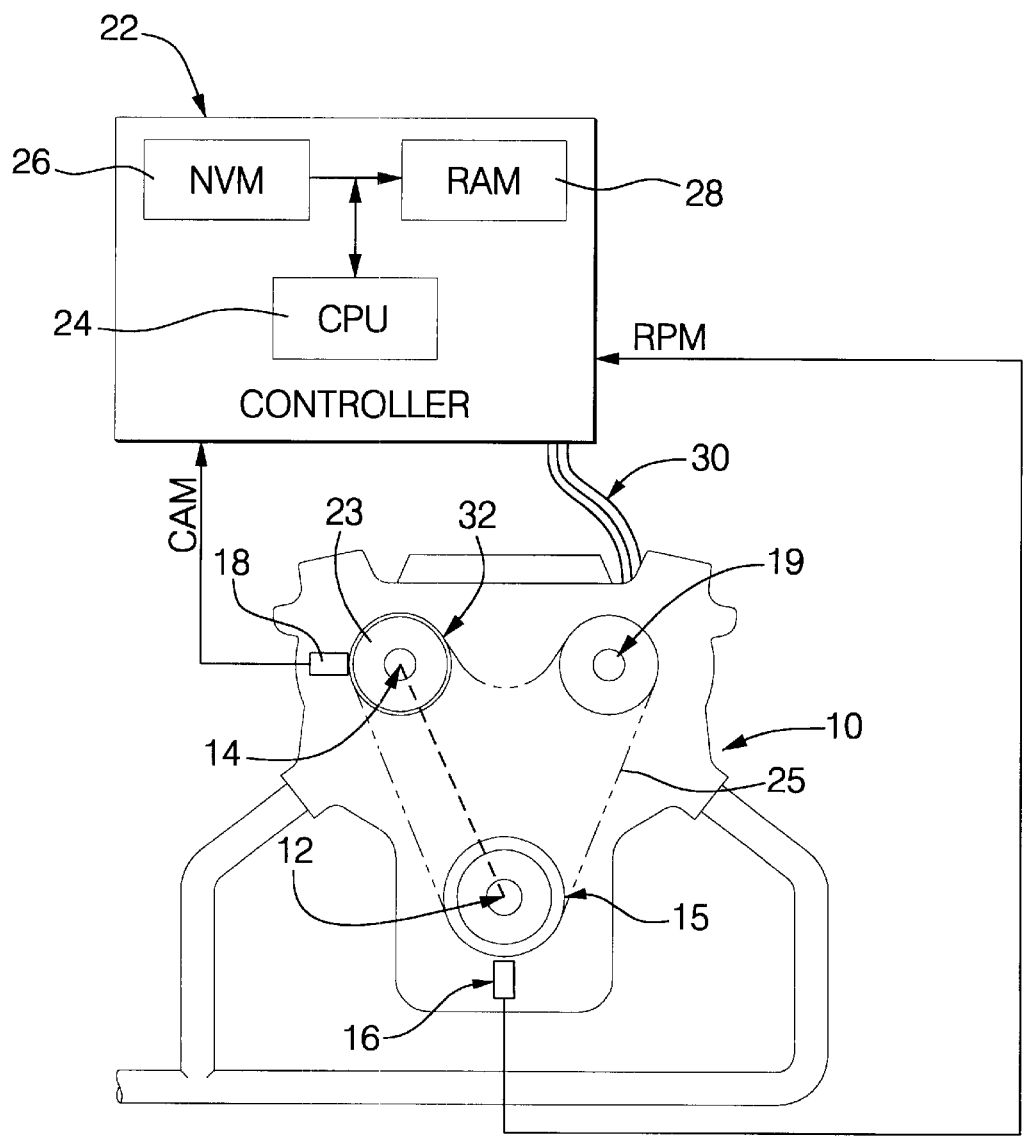
FIG. 2 is a diagrammatic drawing of the engine and control system of the present invention.

Referring to FIG. 2, an internal combustion engine (ICE) 10 having a crankshaft 12 generates a pulse train via the rotation of a target wheel 15 on the crankshaft 12 sensed by a conventional wheel speed sensor 16. The wheel speed sensor 16 may comprise any known wheel speed-sensing device including, but not limited to, variable reluctance sensors, Hall effect sensors, optical switches, and proximity switches. The purpose of the wheel speed sensor 16 is to detect the teeth on the target wheel 15 and provide the pulse train to an electronic controller 22. The electronic controller 22, in conjunction with other sensors, will determine the speed and position of the crankshaft 12 using the pulse train generated by the speed sensor 16.

The vehicle controller 22 may be any known microprocessor or controller used in the art of engine control. In the preferred embodiment, the controller 22 is a microprocessor, having nonvolatile memory NVM 26 such as ROM, EEPROM, or flash memory, random access memory RAM 28, and a central processing unit (CPU) 24. The CPU 24 executes a series of programs to read, condition, and store inputs from vehicle sensors. The controller 22 uses various sensor inputs to control the application of fuel and spark to each cylinder through conventional spark and fuel injector signals 30. The controller 22 further includes calibration constants and software stored in NVM 26 that may be applied to control numerous engine types.

In the preferred embodiment of the present invention, the ICE is equipped with an exhaust camshaft 14 and intake camshaft 19. The exhaust camshaft 14 and intake camshaft 19 are coupled to the crankshaft 12 via a timing belt or chain 25 and sprockets coupled to the camshafts 14, 19. The exhaust camshaft 14 actuates exhaust valves for the cylinders, and the intake camshaft 19 actuates intake valves for the cylinders, as is commonly known in the art. A target wheel 23 coupled to the exhaust camshaft 14 generates periodic signals using wheel speed sensor 18 to provide speed and position information for the exhaust camshaft 14. The wheel speed sensor 18 may be similar in functionality to wheel speed sensor 16.

The present invention may further be equipped with a continuously variable cam phaser 32, as is known in the art. The cam phaser 32 in the preferred embodiment is coupled to the exhaust camshaft 14. In alternate embodiments of the present invention, a cam phaser may be coupled to the intake camshaft 19 or to both the exhaust and intake camshafts 14, 19, or a common intake/exhaust cam depending on the desired performance and emission requirements of the ICE 10. The cam phaser 32 is preferably hydraulically modulated to create a variable rotational offset between the exhaust camshaft 14 and the intake camshaft 19 and/or the crankshaft 12. The degree of rotational offset generated by the cam phaser 32 enables the ICE 10 to be tuned for specific performance requirements by varying valve overlap, i.e., overlap between the exhaust and intake valves of the ICE 10. In applications where it is required that NOx components are reduced, the cam phaser 32 can provide charge dilution in the form of recirculated exhaust gases. Charge dilution is a method of adding an inert substance to the air/fuel mixture in a cylinder of the ICE 10. The inert substance will increase the heat capacity of the air/fuel mixture and reduce the amount of NOx components created during combustion. Accordingly, by regulating the valve overlap area, NOx components may also be regulated. Furthermore, engine performance characteristics such as horsepower and fuel economy may also be modified using the cam phaser. For an ICE equipped with camshafts that operate both intake and exhaust valves, valve timing relative to the combustion cycle may be adjusted.

Figure 3:
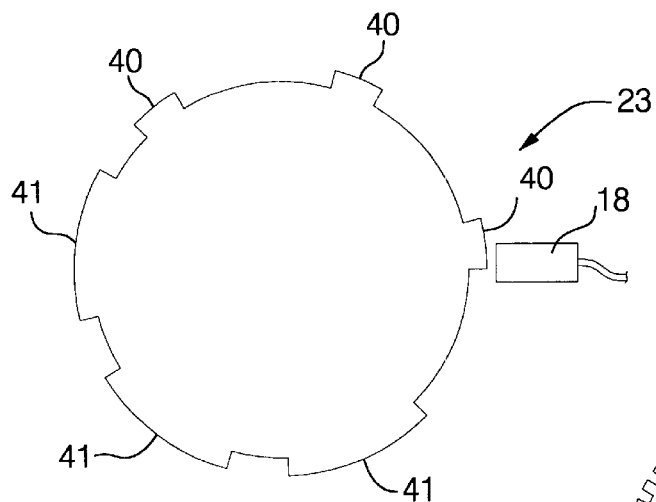
FIGS. 3 and 4 are diagrams of the preferred embodiments of target wheels used in the present invention.

FIG. 3 is a diagram of the target wheel 23 of the preferred embodiment of the present invention that will be described in conjunction with a timing diagram of FIG. 5. The target wheel 23 includes an irregular surface having teeth, slots, or tabs 40 and 41. The teeth 40 are smaller in length than the teeth 41 to differentiate the intake and exhaust phases of the ICE 10. The teeth 40 are fifteen degrees wide and are spaced forty-five degrees apart. The teeth 41 are forty-five degrees wide and are spaced fifteen degrees apart. The inner diameter of the teeth 40 and 41 is preferably 72 mm and the outer diameter is preferably 75 mm, generating a 3 mm tooth height for teeth 40 and 41. The teeth 40 and 41 further include clearly defined edges for generating a pulse train for wheel position sensor 18.

Figure 4:
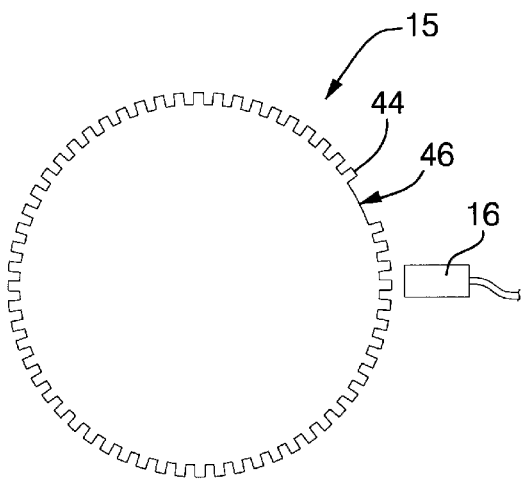

Referring to FIG. 4, the target wheel 15 and sensor 16 are shown. The target wheel 15 preferably has a diameter of 171.89 mm (approximately 4.0 mm wide) and includes fifty-eight teeth 44. The teeth 44 are preferably three degrees apart and three degrees wide and are chamfered on the corners. The height of the teeth 44 is preferably 4.0 mm. The target wheel 15 further includes a fifteen degree-wide void 46 to provide a marker pulse for a complete revolution of the target wheel 15.

Figure 5:
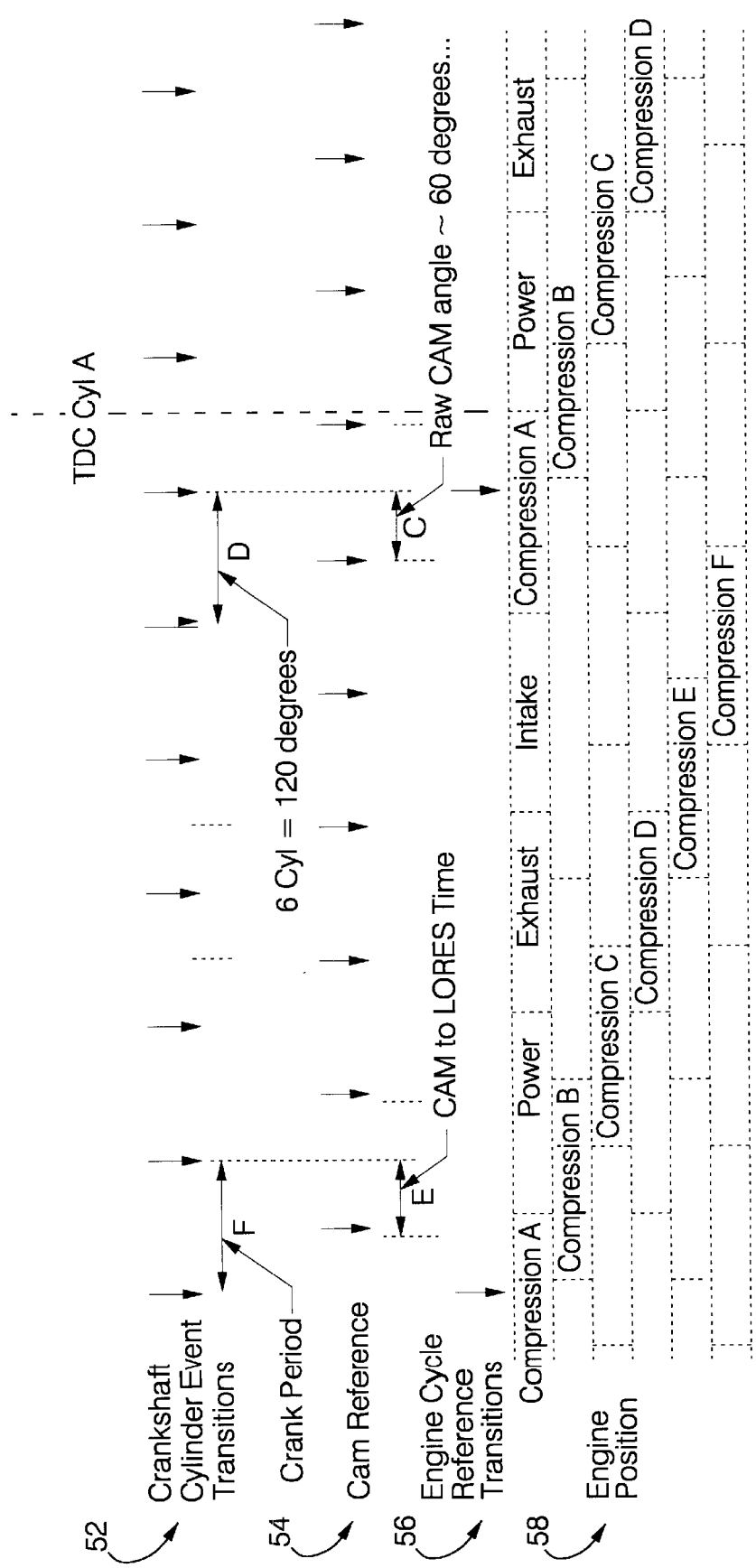
FIG. 5 is a timing diagram illustrating the signals generated by the target wheels of the present invention.

Referring to FIG. 5, a timing diagram is shown with a pulse train 52 generated by the target wheel 15 and target wheel sensor 16, a pulse train 54 generated by the target wheel 23 and target wheel position sensor 18, an engine cycle reference 56, and an engine position reference 58. The pulse trains 52 and 54 include events that correspond to the physical layout of the teeth 40/41 of target wheel 23 and the teeth 44 of target wheel 15. The pulse trains 52 and 54 signal the controller 22 the state of the exhaust camshaft 14 and the state of the crankshaft 12 (i.e., is it in the compression or exhaust phase) and corresponding cylinder events to allow the application of spark and fuel by the controller 22.

In the preferred embodiment of the present invention, the pulse train 52 has been processed to provide a specific cylinder event for each specific pulse. For example, a six pulse period for pulse train 52 will correspond to a six cylinder engine, each pulse indicating the top dead center (TDC) or bottom dead center (BDC) position for the six cylinders. Referring to FIG. 5, the crankshaft 12 to camshaft 14 angle is determined from the following ratios:

$$C/D=E/F$$

Where C=the crankshaft-to-camshaft exhaust camshaft angle
D=the crankshaft period in degrees
E=the period between cylinder and cam events
F=the period between cylinder events
Where D=(720 degrees)/(the number of cylinders in the engine)

The method of the present invention can be described as first zeroing or homing the cam phaser 32 coupled to the target wheel 23 and then rotating the target wheel 23 one revolution such that teeth 40/41 generate the pulse train 54. The individual pulses generated by the teeth 40/41 are referenced to pulses/cylinder events generated by the crankshaft 12 in the pulse train 52 and stored in the controller 22. All camshaft 14 phase positions are thus referenced individually relative to the home position and cylinder events in the pulse train 52. The position of the crankshaft 12 is known to be a certain number of counts from the void 46. Accordingly, by zeroing the cam phaser 32 and learning the individual positions of the teeth 40/41 on startup, the sensor 18 (and sensor 16) will be able to reproduce a consistent signal from teeth 40/41 of target wheel 23. Thus, the physical cam position relative to crank or cam phase may be determined while simultaneously negating effects of tooth to tooth variation on the calculation of the cam phase angle.

Figure 6:
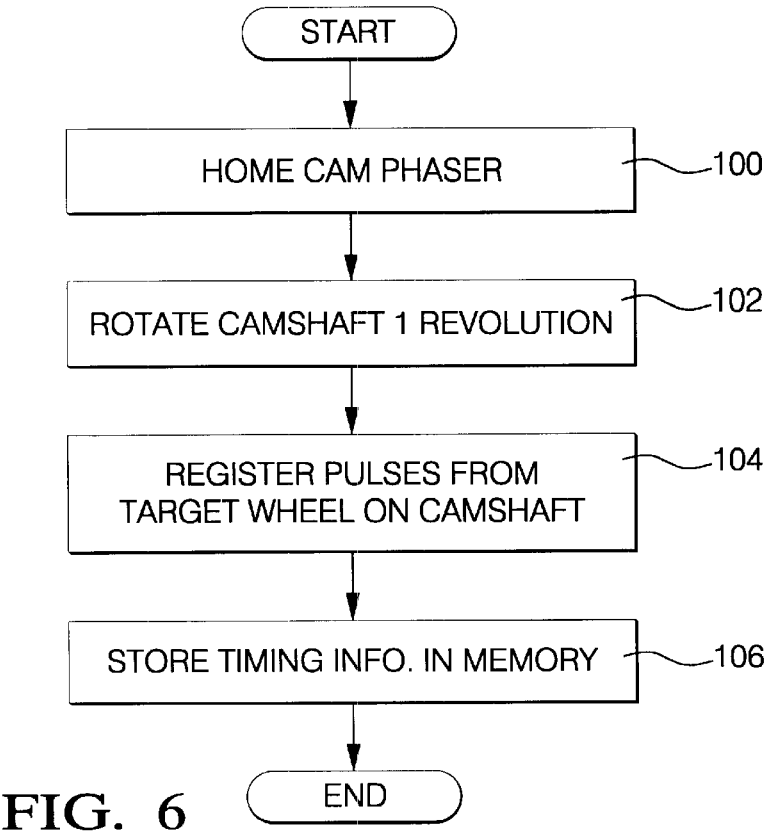
FIG. 6 is a flowchart of the preferred method of the present invention.

The preferred method of the present invention can be seen in FIG. 6 as a flowchart. Starting at block 100, the cam phaser 32 is zeroed or homed to a known position relative to the crankshaft 12. The crankshaft 12 is then rotated at least two revolutions at block 102. The sensor 16 will generate pulses from the target wheel 15 coupled to the crankshaft 12. The routine at block 104 will then register the timing and position of the pulses generated by the sensor 18 and target wheel 23 relative to the pulses generated by sensor 16. The pulse trains 52 and 54 are thus referenced against each other. At block 106, these timing and position values will be stored in the NVM 26 of the controller 22 to be used in the control of the ICE 10. In the preferred embodiment of the present invention, the method will be executed whenever the cam phaser 32 is in the home position and new position values for a tooth will be filtered into the result of the detection of the tooth. This allows compensating for any variations that may be caused by temperature or other environmental conditions. In alternate embodiments of the present invention, the method can be executed at the initial startup of the ICE 10, or the method may be executed when engine timing problems have been detected.

While this invention has been described in terms of some specific embodiments, it will be appreciated that other forms can readily be adapted by one skilled in the art. Accordingly, the scope of this invention is to be considered limited only by the following claims.

What is claimed is:

1. A method of determining the switching states of a target wheel used in an internal combustion engine, the method comprising:

providing a camshaft;

providing a target wheel having teeth coupled to said camshaft;

providing a sensor to detect said teeth of said target wheel;

providing a cam phaser to phase said camshaft relative to a crankshaft of the internal combustion engine;

homing said cam phaser to a known position relative to said crankshaft;

rotating said crankshaft and camshaft;

detecting the switching of a plurality of said teeth using said sensor;

referencing switching information detected by said plurality of teeth to crankshaft position information to produce a calibration for said target wheel; and storing said calibration in a controller to be used for control of the internal combustion engine.

2. The method of claim 1 wherein the step of referencing switching information detected by said teeth to said crankshaft information to produce said calibration comprises referencing said switching information to cylinder events.

3. The method of claim 1 wherein the method is executed at the startup of the internal combustion engine.

4. The method of claim 1 wherein the method is executed upon the detection of an engine timing problem.

5. A internal combustion engine comprising:

an intake manifold for providing air to the internal combustion engine;

a throttle plate controlling the flow of said air;

a fuel injector introducing fuel into said air to form an air/fuel mixture;

at least one piston for combusting said air/fuel mixture;

a plurality of valves to control intake and exhaust of said at least one piston;

a first camshaft having a plurality of lobes to actuate said exhaust valves;

a sprocket coupled to said first camshaft to drive said first camshaft;

a crankshaft coupled to said sprocket via a timing belt;

a cam phaser coupled to said first camshaft;

a controller for controlling the position of said cam phaser;

a target wheel coupled to said camshaft, said target wheel having teeth; and wherein said controller will command said cam phaser to rotate said camshaft to a home position referenced to said crankshaft position; and wherein said crankshaft is rotated to determine the switching positions of said teeth relative to said crankshaft position, said switching positions stored in said controller to control the position of said camshaft.

6. The internal combustion engine of claim 5 wherein the internal combustion engine is a four-cycle engine.

7. The internal combustion engine of claim 5 further comprising a second camshaft, said second camshaft controlling said intake valves.

8. The internal combustion engine of claim 5 wherein at least one of said teeth differs in width from the rest of said teeth.

9. A method of determining the switching states of a target wheel used in an internal combustion engine, the method comprising:

positioning a camshaft coupled to the target wheel to a home position using a cam phaser, said target wheel including a plurality of teeth;

determining a crankshaft position relative to said home position;

rotating said crankshaft and camshaft;

sensing the target wheel teeth using a sensor to generate a pulse train;

referencing said generated pulsetrain to said crankshaft position to generate a calibration, said calibration providing information on relative position between said camshaft and said crankshaft; and storing said calibration in a controller, said controller using said calibration to control the internal combustion engine.

10. The method of claim 9 wherein the method is executed at the startup of the internal combustion engine.

11. The method of claim 9 further comprising the step of detecting an internal combustion engine timing fault.

* * * * *